Patented Aug. 21, 1951

2,564,978

UNITED STATES PATENT OFFICE 2,564,978

MULTICELLULAR GLASS AND METHOD OF MAKING

James Franklin Hyde and Stanley Donald Stookey, Corning, N. Y., assignors to Corning Glass Works, Corning, N. Y., a corporation of New York No Drawing. Application March 7, 1946, Serial No. 652,823

5 Claims. (Cl. 106—41)

This invention relates to the manufacture of multicellular glass by heating an intimate mixture of a pulverized glass and a finely divided foaming agent until the glass particles become soft and coalesce and the soft glass mass is bloated to the desired extent by a multiplicity of small separate bubbles.

As foaming agents various materials which will produce gas or vapor when heated under these conditions have been employed. In some instances the glass itself is so prepared that it contains an abnormal amount of dissolved gas, or compounds such as sulfates which will decompose or react to produce gas. The material most commonly used on a commercial scale as a foaming agent is carbon, together with one or more other gas-producing substances.

When carbon is used, it is not possible to entirely eliminate the carbon from the mass during firing as a result of which the final product is black, which for some purposes is objectionable. Black foam glass is a poor reflector of heat and light and this detracts from its value for thermal insulation. Its color is undesirable for acoustical blocks or wall panels. Moreover, the dust which abrades from the black product on contact with other objects is a source of annoyance.

The primary object of this invention is to produce white multicellular glass having uniformly sized and evenly spaced cells.

Another object is to produce multicellular glass which has a cream or tan color.

Another object is to produce multicellular glass of various colors and tints.

Another object is to provide a carbonaceous foaming agent for the production of multicellular glass which will leave no free carbon in the glass.

Another object is to provide a carbonaceous foaming agent which is sufficient of itself and requires no additional substance nor special glass composition to react therewith for the production of gas.

To these and other ends the invention consists in the method which comprises intimately mixing pulverized glass with a finely divided material comprising an amino compound selected from the class consisting of urea, thiourea, guanidine and salts thereof, oxamide, derivatives of urea, decomposition products of urea, derivatives of thiourea and decomposition products of thiourea, heating the mixture at a temperature and for a time sufficient to cause the glass particles to soften and coalesce and to form a multiplicity of bubbles in the mass and cooling the mass.

We have found that carbonaceous compounds of the above described class are particularly suitable for use as foaming agents in the production of multicellular glass because such compounds are completely gasified by thermal decomposition and leave no residual carbon in the product. Non-sulfur compounds such as urea, guanidine, oxamide, etc., produce snow white multicellular glass. Those compounds which contain sulfur, such as thiourea, produce foam glasses which have a cream or ivory or tan color. Similar tints may be obtained with the non-sulfur compounds if the glass composition contains a small amount of sulfate or other sulfur compound. Various other colors may be obtained by using colored pulverized glasses and foaming agents, provided that the glass does not contain easily reducible metal oxides such as $PbO$, $Sb_2O_3$, $As_2O_3$, etc., which on reduction would discolor the glass. Some amino compounds sublime or boil at such low temperatures that they are not suitable for our purpose and we have found that in general the suitable compounds are those which are relatively stable at a temperature of about 400° C. or higher. We have further found that compounds and derivatives which contain hydrocarbon radicals, such as the lower aliphatic radicals, joined by carbon to carbon linkage are not suitable because foam glass made therewith retains carbon and is black or discolored.

Urea is particularly suitable because it is relatively cheap and available and ultimately completely decomposed at temperatures above 400° C. with the evolution of considerable gas. When first heated, ammonia is evolved and decomposition products comprising cyanuric acid, biuret and triureide remain as a solid mixture which is stable at 400° C., or above. Other gas producing substances such as calcium carbonate may also be included in the mixture.

The following examples will illustrate the invention:

Example 1

A white foam glass having an apparent density of 0.2 and having cells of uniform size was produced by mixing 40 parts by weight of glass pulverized to pass through a screen having 100 meshes per lineal inch with 0.5 part by weight (about 1.2% by weight of the entire mixture) of urea residue 100 mesh and finer, and firing the mixture for about 20 minutes at about 750° C. The glass had approximately the following composition:

| | Per cent |
|---|---|
| $SiO_2$ | 74 |
| $R_2O$ | 16 |
| $CaO$ | 9 |
| $Al_2O_3$ | 1 |

The urea residue was prepared by heating urea moderately until the resulting evolution of ammonia gas ceased and the residue solidified into a white solid which was thermally stable to nearly red heat.

Example 2

Sixty parts by weight of 100 mesh pulverized glass containing a small amount of sulfate added to the batch as $Na_2SO_4$ and having approximately the following composition

| | Per cent |
|---|---|
| $SiO_2$ | 74 |
| $R_2O$ | 16 |
| CaO | 9 |
| $Al_2O_3$ | 1 |
| $SO_3$ | 0.5 | were mixed with one and one-half parts by weight (about 2.4% by weight of the entire mixture) of 100 mesh urea residue. The mixture was fired for about 20 minutes at about 700° C. The product had an ivory color and an apparent density of .16.

Example 3

Sixty parts by weight of the pulverized glass described in Example 2 were mixed with three parts by weight (about 4.8% by weight of the entire mixture) of guanidine carbonate and fired for about ten minutes at about 720° C. An ivory colored foam glass resulted.

Example 4

An ivory colored foam glass was also produced when sixty parts by weight of the pulverized glass described in Example 2 were mixed with three parts by weight (about 4.8% by weight of the entire mixture) of urea and the mixture was fired for about ten minutes at about 720° C.

Example 5

A light yellowish brown colored foam glass resulted when sixty parts by weight of the pulverized glass described in Example 2 were mixed with three parts by weight (about 4.8% by weight of the entire mixture) of thiourea and the mixture was fired for twenty minutes at about 720° C.

Example 6

Cream colored foam glass was produced by mixing sixty parts by weight of the pulverized glass described in Example 2 with three parts by weight (about 4.8% by weight of the entire mixture) of oxamide and firing the mixture for about fifteen minutes at 800° to 850° C.

Example 7

A mixture of sixty parts by weight of the pulverized glass described in Example 2 and three parts (about 4.8%) by weight of cyanuric acid yielded an ivory colored foam glass when heated for about fifteen minutes at 800° to 850° C.

Example 8

An ivory colored foam glass was also produced when sixty parts by weight of the pulverized glass described in Example 2 were mixed with three parts by weight (about 4.8% by weight of the entire mixture) of biuret and fired for fifteen minutes at 850° to 900° C.

Example 9

Ten parts by weight of the glass described in Example 1 and .16 part by weight (about 1.6% by weight of the entire mixture) of urea were ground together for 24 hours at the end of which time 84.5% of the mixture passed through a 325 mesh screen. The mixture was fired at 720° C. until it began to foam, whereupon the temperature was raised to 840° C. in one-half hour and the foamed mass was then cooled with sufficient slowness to anneal it. A white foam glass was obtained.

Various glasses other than the soda-lime glasses described in the foregoing examples may be employed in the new process. However, in order to be successful, the melting point of the glass should not be so high that the foaming agent is completely decomposed and evaporated or dissipated from the mixture before the glass particles have softened and coalesced. Pulverized silica glass is obviously unsuitable for the process. Moreover, as pointed out above, the glass should not contain easily reducible metal oxides, which on being reduced would discolor the glass.

Multicellular glass made by the new process possesses several advantages chief among which is its light color. This causes it to reflect heat and improves its thermal insulating efficiency. Its pleasing color makes it quite suitable for facing walls for acoustical effects, etc. The dust produced by its abrasion on other objects is less objectionable than the black dust of prior products.

We claim:

1. A process for the manufacture of multicellular glass, which comprises heating an intimate mixture consisting of a pulverized soda-lime silicate glass and 1.2% to 4.8% by weight of a finely divided amino compound selected from the group consisting of urea, biuret, thiourea, guanidine, cyanuric acid, and oxamide until softening and coalescence of the glass particles and decomposition of the amino compound with evolution of gaseous material are effected and the soft glass mass is bloated to the desired extent by the multiplicity of bubbles formed therein, and then cooling the resulting cellular mass with retention of its structure.

2. A process for the manufacture of multicellular glass, which comprises heating an intimate mixture consisting of a pulverized soda-lime silicate glass and 1.2% to 4.8% by weight of finely divided urea until softening and coalescence of the glass particles and decomposition of the urea with evolution of gaseous material are effected and the soft glass mass is bloated to the desired extent by the multiplicity of bubbles formed therein, and then cooling the resulting cellular mass with retention of its structure.

3. A process for the manufacture of multicellular glass, which comprises heating an intimate mixture consisting of a pulverized soda-lime silicate glass and 1.2% to 4.8% by weight of finely divided thiourea until softening and coalescence of the glass particles and decomposition of the thiourea with evolution of gaseous material are effected and the soft glass mass is bloated to the desired extent by the multiplicity of bubbles formed therein, and then cooling the resulting cellular mass with retention of its structure.

4. A process for the manufacture of multicellular glass, which comprises heating an intimate mixture consisting of a pulverized soda-lime silicate glass and 1.2% to 4.8% by weight of finely divided guanidine until softening and coalescence of the glass particles and decomposition of the guanidine with evolution of gaseous material are effected and the soft glass mass is bloated to the desired extent by the multiplicity of bubbles formed therein, and then cooling the resulting cellular mass with retention of its structure.

5. A batch for a multicellular glass, which consists of an intimate mixture of a pulverized soda-lime silicate glass and 1.2% to 4.8% by weight of a finely divided amino compound selected from the group consisting of urea, biuret, thiourea, guanidine, cyanuric acid, and oxamide.

JAMES FRANKLIN HYDE.
STANLEY DONALD STOOKEY.

REFERENCES CITED

The following references are of record in the file of this patent:

UNITED STATES PATENTS

| Number | Name | Date |
| --- | --- | --- |
| 520,266 | Maurer | May 22, 1894 |
| 2,102,630 | Kreidl | Dec. 21, 1937 |
| 2,310,432 | Haux | Feb. 9, 1943 |
| 2,322,581 | Lytle | June 22, 1943 |
| 2,341,242 | Rosenberg | Feb. 8, 1944 |
| 2,485,724 | Ford | Oct. 25, 1949 |

FOREIGN PATENTS

| Number | Country | Date |
| --- | --- | --- |
| 422,715 | Germany | 1925 |
| 460,210 | Great Britain | 1937 |